United States Patent [19]

Pischke et al.

[11] 4,059,706

[45] * Nov. 22, 1977

[54] SPRAY-DRIED L-ASPARTIC ACID DERIVATIVES

[75] Inventors: LaMonte D. Pischke; Myron D. Shoaf, both of Danbury, Conn.

[73] Assignee: General Foods Corporation, White Plains, N.Y.

[*] Notice: The portion of the term of this patent subsequent to Mar. 8, 1993, has been disclaimed.

[21] Appl. No.: 550,084

[22] Filed: Feb. 14, 1975

Related U.S. Application Data

[63] Continuation-in-part of Ser. No. 448,845, March 7, 1974, Pat. No. 3,962,468.

[51] Int. Cl.$^2$ .............................................. A23L 1/236
[52] U.S. Cl. ...................................... 426/548; 426/96; 426/103; 426/658; 426/471; 426/804
[58] Field of Search ................... 426/89, 96, 548, 103, 426/658, 471, 804

[56] References Cited

U.S. PATENT DOCUMENTS

| | | | |
|---|---|---|---|
| 3,695,898 | 10/1972 | Hill et al. | 426/548 |
| 3,753,739 | 8/1973 | Cella et al. | 426/548 |
| 3,761,288 | 9/1973 | Glicksman et al. | 426/548 |
| 3,928,633 | 12/1975 | Shoaf et al. | 426/96 |

*Primary Examiner*—Raymond N. Jones
*Assistant Examiner*—Esther M. Kepplinger
*Attorney, Agent, or Firm*—Thomas V. Sullivan; Bruno P. Struzzi

[57] ABSTRACT

A slurry-forming substantial level of discretely-sized undissolved L-aspartic acid sweetening compound, preferably one milled to reduce the particle size of undissolved ester crystals, is encapsulated in a water soluble encapsulating agent by drying a uniform dispersion as by spray drying to yield a high density readily soluble powderous sweetening composition which is readily blendable and uniform in sweetening power and resists caking and clumping.

18 Claims, No Drawings

SPRAY-DRIED L-ASPARTIC ACID DERIVATIVES

RELATED INVENTIONS

This application is a Continuation-in-Part of U.S. application Ser. No. 448,845, filed Mar. 7, 1974, for SPRAY-DRIED L-ASPARTIC ACID DERIVATIVES, now U.S. Pat. No. 3,962,468, issued June 8, 1976.

This invention is related to but distinct from U.S. Pat. No. 3,761,288 issued Sept. 25, 1973 to Glicksman et al. for Method For Making a Low Calorie Sweetening Composition and employs L-aspartic acid compounds of the type set forth in said Glicksman et al. patent and U.S. Pat. Nos. 3,492,131 to Schlatter issued Jan. 27, 1970 for Peptide Sweetening Agents, 3,475,403 to Mazur et al. issued Oct. 28, 1969 for Aspartic Acid Containing Dipeptide Lower Alkyl Esters; 3,714,139 to Schlatter issued Jan. 30, 1973 for Optionally Substituted Aspartyl Cyclohexylalanine Lower Alkyl Esters, Compositions and Method; 3,695,898 to Hill et al. issued Oct. 3, 1972 for Sweetening Compositions Containing Saccharin and Dipeptides; 3,642, 491 to Schlatter issued Feb. 15, 1972 for Artificially Sweetened Consumable Products; 3,799,918 to Mazur issued Mar. 26, 1974 for Alkyl Esters of α-Aspartyl α-Alkyl Aliphatic Amino Acid Dipeptides; and 3,800,046 to Schlatter issued Mar. 26, 1974 for Artificially Sweetened Consumable Products, all hereinafter referred to as L-aspartic acid derivatives.

BACKGROUND OF THE INVENTION

This invention relates to new and useful L-aspartic acid derivatives and non-toxic, pharmaceutically acceptable salts thereof and more particularly is concerned with compositions wherein such derivatives are fixed in a stable, superficially dry form usable in comestibles such as dry beverage mixes.

Synthetic sweetening agents have become quite useful in their ability to lower sugar intake and provide diets of satisfactory taste but lowered caloric value. One of the more consequential and promising sweeteners is the class of L-aspartic acid derived esters which have emerged in attempts to find new artificial sweeteners other than the more common saccharine or cyclamates which have previously been used.

The use of such recent sweeteners in comestibles and particularly in dry mixes such as in beverage mixes presents a significant opportunity to provide sweetness equivalent to sucrose. However, it is important that the esters be stabilized in a form whereby they do not undergo degradation with accompanying loss of sweetness and are unavailable for reaction with aldehydes or ketones or other agents which may alter intended organoleptic response when the ultimate sweetened composition is consumed. Many of these L-aspartic acid derivatives such as L-aspartyl-L-phenylalanine methyl ester (APM) are prone to undergo a loss of sweetness in the presence of moisture rendering such derivatives virtually non-functional in many food applications. Moreover, in attempts to stabilize the ester in a dry fixation, it is important that it be uniformly distributed to provide sweetness uniformity; this is quite important in view of the manifold sweetening power of such esters. A related requisite is that any fixed ester be stable against caking; many such esters are per se prone to cluster and even when fixed in certain matrices will promote such caking as occasions the need for expensive packaging barriers; even under the most extreme moisture protection common fixation of esters such as APM can experience caking due to the character of the ester and its capacity to gain moisture with increasing relative humidities, particularly when stored with other food materials such as food acids like citric acid and colloids such as hygroscopic dextrins.

It is desirable, therefore, to so compose the L-aspartic acid derivatives in a form whereby they do not suffer the foregoing sensitivities to storage conditions. Preferably such a composition should have a reasonably controlled equilibrium relative humidity, that is an equilibrium relative humidity wherein it does not significantly absorb moisture to an extent whereby the derivative undergoes decomposition or reaction. The high order of sweetness necessitates use of the compounds in controlled amounts as a minor weight constituent of the total powderous mixture of which they form a part, typically less than 15%. In order to facilitate handling of the sweetening compositions of which the ester is a part, it becomes desirable to have the derivative compound fixed in a suitable solid carrier at a very high weight percent, generally in excess of 20% of the carrier or fixative. It is desirable to minimize the amount of fixative for the sweetening derivative since it is otherwise non-functional, adds bulk and cost, and indeed detracts significantly from the ability to market comestibles with claims for substantial reduction of calories. It also becomes quite desirable to have the carrier associated with the L-aspartic acid derivative by a process which does not significantly reduce the density of the sweetening ester-containing composition particles; this reduces any segregation difficulty encountered by reason of too wide a disparity with food acid or like particles having a high bulk density, say, of about 0.8 grams per cc. The absolute density of one of these L-aspartic acid derivatives (APM) is in an order of 1.038 grams per cc. but the bulk density of its characteristic needle-like crystalline structure is about 0.2 grams per cc; thus, it becomes desirable to achieve a density in the composition containing the derivative as high as practicable and in any event not less than 0.2 grams per cc. to provide flow and handling properties facilitating uniformity in mixing and packaging of the synthetic sweetening agent in powderous beverage and like mixes for other comestibles having significant amounts of higher density particles. Concomitantly, in effecting this density criteria, it is important that the carrier provide the foregoing protection against other packaging conditions which are set forth hereinabove; i.e. the effects of moisture as by providing a relatively low-hygroscopic state. Furthermore, it becomes desirable to achieve both objectives of bulk density increase and a compatible equilibrium relative humidity uniformly in a composition that can be economically processed without a significant loss of the L-aspartic acid ester derivative in functionaity or yield as by premature or uncontrolled crystallization and interference or interruption of the fixation operation, as by spray drying or loss of sweetness and flowability in mixes upon storage. Indeed, it is most preferred to employ a process which minimizes the hazard of functionality loss by high temperature processing such as may be required to render soluble and/or uniformly distributed the comparatively insoluble sweetening dipeptide.

STATEMENT OF THE INVENTION

It has now been found that the foregoing requisites can be provided while affording an artificial sweetener which has a practical and useful high rate of solution by co-drying in a water soluble edible encapsulating agent, typified by a malto-dextrin solution, a high (e.g. 30 – 90% of total solids) slurry-producing level of discretely distributed, small-sized, undissolved particles of L-aspartic acid derivative sweetening compounds to be hereinafter classified, the level of said undissolved sweetening compound solids being in excess of the total sweetening solids in solution in said dispersion and thus producing a slurry of predominantly undissolved sweetening L-aspartic acid derivatives. In accordance with its broadest parameters, the invention contemplates that a wide class of L-aspartic acid derivatives and typically dipeptide sweeteners like APM can be advantageously dried while being discretely dispersed and in an aqueous solution of a corn syrup dextrin or like low-molecular weight starch hydrolysis product. The preferred drying procedure that is employed will involve the conversion of this slurry into discrete droplets which are then dried as in a spray drying tower.

The dextrin material used should dissolve easily in water and preferably produce a clear solution and should be relatively non-hygroscopic. In this regard the dextrin material should have a sufficiently low molecular weight to be easily soluble in water and yet be high enough so that hygroscopicity is avoided in large measure; a dextrin material which results in a dextrose equivalency in solution in the order of 1–40 will be operable but preferably should be below 20 D.E., a typical useful dextrin will be in the range of 5–15 D.E. It is believed that best results will be obtained if the dextrin material contains little or no mono-saccharides, i.e. glucose, and contains a predominant (major) distribution of oligosaccharides, i.e. saccharides having 1–8 saccharide units, with a significant presence of hexamers and heptamers; a useful dextrin material will be an enzymatic corn syrup digestion or hydrolyzate typified by the product available from CPC International, Inc. under the name Mor-Rex.

Other forms of water-soluble encapsulating solid materials may be employed such as gum arabic and equivalent hydrophillic colloids such as gum tragacanth, xanthan gum and polysaccharides like pectin, algin, Irish moss; cellulosic derivatives such as methyl cellulose or ethyl cellulose; edible food solids such as milk solids like lactose or whey; inorganic compounds such as monocalcium and dicalcium phosphates which in combination with other materials or separately serve in encapsulating functions; protein hydrolyzates such as gelatins of low Bloom having film-forming properties; synthetic polymers particularly suited for encapsulating applications such as glucose polymers described in U.S. Pat. No. 3,766,165 issued Oct. 16, 1973 to Rennhard and which despite hygroscopicity appears to be less prone towards deliquescence under conditions of storage insofar as the ability of the APM and like L-aspartic acid derivatives to co-exist therewith; it appears that the fixed APM has the ability to compensate for the tendency of hygroscopic encapsulating agents to deliquesce under moist conditions; thus, the polyglucose can be employed at a substantial ratio in combination with the dipeptide, particularly if proper packaging is provided which minimizes risks attendant upon the hygroscopicity of the polyglucose; and lastly, among the functional encapsulating carriers are polyhydric alcohols such as mannitol and sorbitol and mixtures thereof, it again being understood that the moisture protecting packaging dictates of a given food mix containing the high density sweetener will determine the suitability of use of such polyhydric alcohols.

For economic considerations, it is desired to minimize the level of encapsulating solids employed, and, collaterally avoid a significant loss in sweetness functionality through processing. The L-aspartic acid derivatives as a general class are reported as temperature sensitive and it is desirable to reduce the total elapsed time of exposure of these derivatives to heat. Operating with a slurry of predominantly undissolved derivatives at a temperature say below 160° F and ideally at ambient room temperature conditions or slightly higher, typically in the neighborhood of 70° – 100° F, the risk of attendant degradation of the L-aspartic acid derivative is minimized. By maintaining a high concentration of APM in the slurry form, it is practicable that one can dry such a slurry while maintaining the derivatives in a suspension preparatory to ultimate co-drying with the encapsulating agent.

It will be preferred art to employ a ratio of 1:4 to 4:1 of L-aspartic acid derivative to encapsulating agent solids and a level of water whereby the sweetening compound per se will not be completely dissolved, but rather present as undissolved ester in the majority by weight, as this assures a slurry form of preferred drying characteristic. The amount of water employed will be dependent to some degree upon the concentration of the L-aspartic acid derivatives. As the derivative concentration is reduced in relationship to the encapsulating solids, the amount of water required will be correspondingly reduced. Nevertheless, it will be desirable to employ that amount of water which will assure a handleable, pumpable slurry. It is not necessary that the amount of moisture employed to create the slurry be minimized for, in fact, the levels of moisture employed while creating any slurry-producing consistency can be increased many fold. On the other hand, such an increase will serve to introduce engineering inefficiencies by reason of the need to evaporate greater quantities of water; incident to such evaporation there will be the attendant risk of loss of stability or decomposition of the derivative by exposure to heat at said elevated temperatures.

Unscheduled interruptions in production and prolonged hold-up preparatory to drying are a common occurrence in the processing of foodstuffs generally. By processing a slurry and particularly a slurry which is handleable at ambient conditions the risks that are incurred by elevated temperature processing and holding preparatory to drying are minimized and avoided.

On the other hand, at above 90% of total slurry solids the L-aspartic acid derivative is not as advantageously processed. To be sure, there is a lessened expense due to the use of a lesser amount of an encapsulating agent. But for many functional purposes, it will be desirable to afford encapsulation by materials extraneous to the L-aspartic acid derivative itself. Ability to effectively achieve external matrices around the derivatives such that it is in a stable free-flowing and high density condition will be lessened when the dipeptide generally exceeds 90% of the total solids.

Where it is practical to control processing temperatures one may wish to process a material at a more elevated temperature for an abbreviated period of time, say a time period of less than 10 minutes at above 200° F. In this instance, therefore, one may choose to put more of the L-aspartic acid into solution by reason of the elevated temperature. Nevertheless, it will be practical, even at the elevated short-time processing conditions, to create a slurry form wherein discretely distributed undissolved particles of the L-aspartic acid derivative are dispersed and fixed as such in the encapsulating agent. In this practice it will be preferred to operate at a slurry-handling temperature which is generally below 300° F and more commonly below 212° F whereat the risks of instability and decomposition with attendant loss of sweetness are eliminated.

The physical structure produced upon drying a slurry-forming level of the L-aspartic acid derivative will be characterized by a random distribution of matted crystals wherein the original crystalline structure will be detectable under electron microscopy; crystals of the L-aspartic acid derivative APM will retain their rod-like identity; APM crystalline structure will be manifest under polarizing light. When the slurry is spray dried rapidly in a droplet form, the composition will be in the form of a hollow sphere wherein the crystals will assemble in more-or-less random nested enveloped orientation within a shell-like matrix formed by the encapsulating agent, e.g. dextrin. When viewed under normal microscopy, many of the particles will evidence the existence of discrete randomly nested crystals of undissolved sweetening compound; many of the crystals will appear to be interlaced while being bound or enveloped by the relatively transparent encapsulating matrix. Whereas some particles will evidence a slight occasional protrusion of needle-like particles from this matrix, the large majority, if not the entirety, thereof will appear to be continuously enveloped by the dextrin material. Under natural light, the particles will have a glassy, glossy appearance and will retain this appearance after storage at ambient room temperature conditions. It is believed that the L-aspartic acid derivative has preferred stability and protection against loss of functionality by existing as such in the crystalline state as contrasted with the relatively amorphous "glass" condition that will be created by drying a solution of the derivative in the absence of undissolved particles thereof in the encapsulating matrix-solids.

Generally, for such L-aspartic acid derivatives as APM, the crystal per se will undergo a moisture gain in the neighborhood of about 8%. When such a derivative is encapsulated in a medium such as dextrin or equivalent solids, the composition will undergo a corresponding moisture gain as packaging relative humidities are increased. However, despite hygroscopicity of the encapsulating agent and the moisture gain that will ensue on increased relative humidity storage, particles of the composition will remain substantially free-flowing and will not cake. It appears that the derivative has the capacity to withstand moisture absorption in a closely associated state with the encapsulating agent, particularly when the derivative is preponderantly in a crystalline form. Thus, the dried composition can be admixed with the other food solids such as citric acid and like deliquescent acidulants which, when otherwise admixed with the derivative, would be prone to undergo caking and thus become non-free-flowing. This property renders the composition capable of being stored for long periods perparatory to blending and packaging with other constituents of a given food mix.

The preferred L-aspartic acid derivative is the methyl ester of L-aspartyl L-phenylalanine and like L-L dipeptides as well as isomers containing the L-L dipeptide, that is, DL-aspartyl-L-phenylalanine, L-aspartyl-DL-phenylalanine and DL-aspartyl-DL-phenylalanine. The present invention is not predicated upon any specific sweetener of L-aspartic acid derivation but rather is intended to be functional for the wide class of such compounds dried from a hydrated and not completely dissolved slurry state. The sweetening property of the dipeptide substances is dependent also upon the sterochemistry of the individual amino acids, i.e., aspartic acid and phenylalanine, from which the dipeptides are derived. Each of the amino acids can exist in either the D or L form, but it has been determined that the L-aspartyl-L-phenylalanine esters are sweet while the corresponding D-D, D-L and L-D isomers are not. Combinations of isomers which contain the L-L dipeptide, i.e., DL-aspartyl-L-phenylalanine, L-aspartyl-DL-phenylalanine and DL-aspartyl-DL-phenylalanine are sweet also. Other lower alkyl esters of aspartic acid of use herein possess a sweet taste. Aspartic acid containing dipeptide lower alkyl esters are represented by the following structural formula:

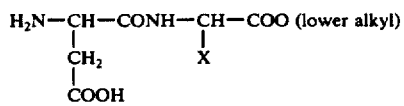

wherein X is one of the following radicals

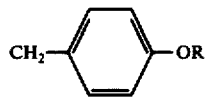

or

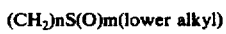

R being hydrogen or a lower alkyl radical, $m$ being an integer selected from the group consisting of 0 and 2 and $n$ being a positive integer less than 3. The lower alkyl radicals symbolized in the foregoing structural formula are typified by methyl, ethyl, propyl, butyl, pentyl, hexyl, heptyl and the branched-chain radicals thereof.

The class of L-aspartic acid derivatives which are sweet generally have a low solubility rate, e.g., APM, and, although the acid salts thereof such as the citric acid salt of APM are more soluble, the rates of solubility still leave much to be desired. The present invention takes advantage of the insolubility of these derivatives by suspending them as discrete dispersions in the encapsulation solution at high concentrations, preferably by maintaining the slurry at low enough temperatures, generally below 160° F, to assure a continued slurry formation as contrasted with complete solubilization. However, in some applications it may be convenient and desirable to increase solubility as well as density somewhat by including the fixing solids an edible food acid such as citric, phosphoric, tartaric or fumaric among the class of like organic as well as inorganic acids; in the practice of the invention, a discrete dispersion of undissolved ester particles should still remain; an appropriate rule will be that a major amount of undissolved sweetening compound solids will remain in suspension and be separable by vacuum filtration prior to dehydration; acid level criteria will partly be a function of the sweetening ester concentration and to a large degree the intended sweetening composition density.

For some marketing requirements, it may be desirable to increase density up to, say, 0.50 grams per cc, and the use of acids such as citric acid as a minor weight percent of the encapsulating solids or the sweetening ester solids will produce preferred results. Generally, the objects of the invention can be met by encapsulating the L-aspartic acid derivatives in a most dense readily soluble and readily flowable form through use of edible acids in the fixative solution as a minor percent of the encapsulating solids per se; say, 0-10% of the total solids in the composition.

In the broad context the invention strives to have an incomplete solution of the sweetening ester compound and so in some applications no substantial acidifying will be added.

These means for effecting dehydration of the aforesaid dispersion are not critical and means will occur to those skilled in the art whereby droplets can be effectively formed and the dispersed compounds effectively encapsulated with a satisfactorily recovered yield of dried powderous material. However, in practicing the preferred drying process, spray drying, certain precautionary procedures should be followed. The trajectory of the droplets should be such that they do not hit the sides of the drying tower while in the wet form so as to occasion plastering of the dryer walls. An inlet drying air temperature below 475° is preferred in order to avoid browning of the material and occasion degradation of the heat sensitive and reactive L-aspartic acid compound; a preferred inlet air temperature will range between 300° - 450° F, it being understood that dryer inlet temperature conditions are a function of the relationship thereof to the quantity of heated air or other drying gas and the relative feed rates of the charge of particles, their size and quantity, all of which factors are experimentally and routinely derived in producing beadlet of 1 - 5% moisture.

By practicing this invention densities of spray dried spheres may be recovered which range between 0.20 and 0.35 grams per cc, although still higher densities may be achieved with increased use of acids in the slurry. Spray dried material that is recovered in this density range are essentially in the form of spherical particles most of which are hollow and some of which are hollow and some of which are relatively solid or beadlet in physical form.

The quantity of moisture to effect dispersion in an encapsulating solution is not critical but preferably the total solids will be a minor weight percent of the feed solution to the drying tower. As one reduces moisture content and correspondingly increases solids content as by increasing the level of the sweetening compound to be dried, greater care is required to assure effective dispersion of the compound. This is effected in slurries employing 15% or more L-aspartic acid derivative by weight of the total solids feed by assuring effective grinding or trituration thereof, that is passage of the dispersion through a narrow orifice having an opening no larger than 125 microns, so that needle-like crystals are essentially finely divided, preferably though not essentially in the presence of the encapsulating solution. In this way, the dispersed L-aspartic acid compound i.e., APM, is effectively and homogeneously distributed. A typical feed stock will be a viscous solution which is converted to a smooth, non-granular, cream-like texture; a good test that the correct dispersion is produced is to separately add an equal quantity of water to an aliquot of the dispersion and observe the individual particles and their dispersed state; if the particles display the required uniform dispersion by such testing, they will instantly disperse and any large clustered particles will separate.

The invention will now be described by reference to the accompanying operative example.

BEST MODE

The following is a procedure for preparing 25% solids slurry for processing through a Fryma mill, the stones of which are adjusted to a spacing of about 75 microns. A dispersion is prepared consisting of 60% APM solids and 40% corn syrup solids (malto-dextrin), 10 D.E. The dispersion at 70° F enters the mill and issues at a temperature of approximately 85° F therefrom, the mill being jacketed with water maintained at 160° F. The "finished" relatively cool aerated slurry is collected in a stainless steel kettle at a density of 0.75 grams per cc and is pumped by a positive displacement pump and fed under 250 p.s.i.g. spray pressure through a 40/27 nozzle and produces droplets which when dried have a size of 50 - 300 microns. The droplets are contacted by inlet drying air at approximately 330° F entering a 16 ft. diameter vertical drying tower, the air being fed at 14000 cubic feet per minute and the outlet air temperature being at 210° F.

The droplets dry as predominantly spherical beads collected at a moisture content generally less than 5% and typically 2 - 3%. The dry particles have the following particle size distribution:

| Particle Size (U.S. Standard Sieve) | Weight % |
|---|---|
| +50 | 2.57 |
| −50, +70 | 27.33 |
| −70, +120 | 45.25 |
| −120, +140 | 10.60 |
| −140, +200 | 11.38 |
| −200, +300 | 1.74 |
| Pan | 1.13 |

The particles have a uniform particle size distribution, are free-flowing, white, and dissolve in 60 seconds in 45° F water when in the presence of a beverage acid such as citric acid at pH 3.5. The droplets have a loose bulk density of 0.246 grams per cc and packed density after tapping to reduce volume 12.8% of 0.282 grams per cc.

The particles can be readily blended to a flowable condition with beverage mix ingredients such as dry citric acid or equivalent acidulent powder, flavors and colors and will be stable against caking when packaged in a water vapor transmission packaging barrier such as a polyethylene coated foil having a water vapor transmission of about 0.04 gms per 100 sq. inches in 24 hours at 100° F (95% Rel. Humidity).

The preferred technique of wet-milling is intended to avoid the eccentricities which are occasioned when APM crystals that may be needle-like or otherwise large-sized and not readily uniformly dispersible require some degree of subdivision; after milling the dipeptide particle size will generally range from 1 to 75 microns. It is important that the aspartic acid derivative be provided in the aqueous medium in the absence of clusters as it is transferred in slurry form at a high concentration to the zone of dehydration; particle size reduction assures this cluster-free condition.

Although the invention has been more particularly and fully described by reference herein to spray-drying conditions which ideally produce a spherical particle, the processing advantages accrue to other procedures for the stabilization of the aspartic acid derivative sweeteners. Thus a slurry produced in accordance with the process may be dried on a vacuum or atmospheric drum dryer, in a tray dryer or on or fell in a through circulation gas (air) dryer. Such forms of fixation drying will generally call for subdivision subsequently and a sizing to suit blendability for providing a uniform ingredient sweetness in the mix.

The specification has disclosed preferred embodiments wherein the dextrose equivalency of the dextrin solute is below 20 D.E. It is within the ambit of the present invention that less preferred fixations of the sweetening derivative are practical in higher dextrose equivalent solutes ranging as high as 40 D.E. stickiness of the solute and/or the possibility of undesired interaction in the dried state being the limiting determinant.

It is a practical processing advantage of this invention that by producing a cool slurry-distribution of the aspartic acid sweetening compound one is able to produce extraordinarily high concentrations of the derivative by weight (i.e. above 30%) of the carrier of fixative solids without encountering equipment plugging or blockage of drying equipment such as spray-drying atomizing nozzles and assuring a continuous and uniform sweetness in the ultimately dried composition. The degree of concentration is not critical to this invention and its benefits will be obtained at undissolved ester concentrations below 15% by weight of the total solids, it being understood that concentrations ranging from 20% to as high as 60% are optimal and ideal by reason of the ability to afford a much higher ratio of sweetness to calories contributed by the carrier. Thus, not only does the present invention provide a composition that is dense, stable, soluble and flowable; advantageously, in accordance with its most preferred aspects, a beverage or dessert mix compositions is practical having an extremely low caloric value stemming from an admixture of edible food acids, buffer salts and natural or artificial colors and flavors combined with a fixative which contributes less than 0.5 calories per sweetness level equivalent to a comparable sweetness of sucrose.

The particles will have an equilibrium relative humidity as indicated above which admirably suits them for packaging with other food solids including relatively anhydrous acids such as citric. The spray dried form of fixed sweetener will have an equilibrium relative humidity at room temperature (68° F) such that the particles do not pick up more than 9% moisture in cases where the composition is dried to about 3% moisture; at between 40 and 80% equilibrium relative humidites at room temperature, a product fixed in dextrin will pick up less moisture than the ground counterpart that is unfixed; this indicates less of a tendency to absorb moisture under normal packaging condition; on the other hand, the relative difference in moisture pick-up will generally not be reduced by more than 2% moisture gain at any given equilibrium relative humidity.

What is claimed is:

1. A process for fixation of sweet L-aspartic acid derivative dipeptide compounds which comprises forming a dispersion containing a slurry of undissolved particles of said sweetening compound in an aqueous solution of encapsulating agent, the level of said undissolved sweetening compound solids being in excess of the total sweetening solids of said compounds in solution in said dispersion and the dispersion being maintained at a temperature low enough to assure the existence of at least a part of the sweetening compound as discretely distributed undissolved particles, and drying said dispersion to a moisture content below 5% and a density greater than 0.2 grams per cc. to encapsulate the particles of said sweetening compound in said encapsulating agent.

2. The process of claim 1 wherein the dispersion is sprayed as droplets and then dried.

3. The process of claim 1 wherein the sweetening compound is milled while in an aqueous medium to effect said dispersion.

4. The process of claim 3 wherein the sweetening compound is admixed with the encapsulating solution and then milled.

5. The process of claim 1 wherein the encapsulating agent is a dextrin material having a D.E. less than 40.

6. The process of claim 5 wherein the dextrin has a dextrose equivalency of 5-15 and wherein the dextrin material contains a major amount of oligosaccharides.

7. The process of claim 1 wherein the sweetening compound is a lower alkyl ester of L-aspartyl-L-phenylalanine.

8. The process of claim 7 wherein the slurry is maintained below 160° F.

9. The process of claim 1 wherein the dispersion is acidified.

10. The process of claim 9 wherein the acid content of the dispersion is a minor percent of the fixing solids.

11. The process of claim 10 wherein the acid is less than 10% of the composition.

12. The process of claim 1 wherein the dispersion is maintained below 100° F throughout processing.

13. The process of claim 1 wherein the sweetening compound is present at a level of 30 – 90% of the total solids in the dispersion.

14. The process of claim 1 wherein the dispersion is milled at a temperature less than 160° F and then spray dried at an inlet air temperature below 475° F to produce discrete hollow spherical particles.

15. The process of claim 14 wherein the sweetening compound is at least 15% of the total solids in the dispersion and the ratio of said sweetening compound to said encapsulating agent is 1:4 to 4:1 and wherein compound particles are milled in said dispersion by passage through a narrow orifice having an opening no larger than 125 microns.

16. The process of claim 15 wherein said sweetening compound is 30 – 90 percent of the total solids in said dispersion.

17. The process of claim 16 wherein said sweetening compound is a lower alkyl ester of L-aspartyl-L-phenylalanine.

18. The process of claim 17 wherein said ester is the methyl ester.

* * * * *